US012221709B2

United States Patent
Dumoulin et al.

(10) Patent No.: US 12,221,709 B2
(45) Date of Patent: Feb. 11, 2025

(54) HIGH TEMPERATURE ELECTROLYSER SYSTEM OPTIMISED BY AN INTERMEDIATE CIRCUIT RECOVERY MODULE

(71) Applicant: COMMISSARIAT A L'ENERGIE ATOMIQUE ET AUX ENERGIES ALTERNATIVES, Paris (FR)

(72) Inventors: Pierre Dumoulin, Grenoble (FR); Nicolas Tauveron, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/682,345

(22) PCT Filed: Aug. 8, 2022

(86) PCT No.: PCT/EP2022/072269
§ 371 (c)(1),
(2) Date: Feb. 8, 2024

(87) PCT Pub. No.: WO2023/016998
PCT Pub. Date: Feb. 16, 2023

(65) Prior Publication Data
US 2024/0263317 A1    Aug. 8, 2024

(30) Foreign Application Priority Data
Aug. 10, 2021   (FR) ...................................... 2108605

(51) Int. Cl.
*C25B 1/042*   (2021.01)
*C25B 9/67*    (2021.01)
(Continued)

(52) U.S. Cl.
CPC ................ *C25B 1/042* (2021.01); *C25B 9/67* (2021.01); *C25B 15/021* (2021.01); *C25B 15/08* (2013.01); *Y02E 60/36* (2013.01); *Y02E 60/50* (2013.01)

(58) Field of Classification Search
CPC ........... C25B 1/042; C25B 1/04; C25B 15/08; C25B 15/021; H01M 8/186
(Continued)

(56) References Cited

U.S. PATENT DOCUMENTS

| 5,312,699 A | 5/1994 | Yanagi et al. |
| 7,863,340 B2 * | 1/2011 | Severinsky ............... C01B 3/16 |
| | | 518/700 |

(Continued)

FOREIGN PATENT DOCUMENTS

| JP | 6-93482 A | 4/1994 |
| JP | 6346013 B2 | 6/2018 |

(Continued)

OTHER PUBLICATIONS

Wang et al. "Trade-off designs and comparative exergy evaluation of solid-oxide electrolyzer based power-to-methane plants" International Journal of Hydrogen Energy 44 (2019) 9529-9543 (Year: 2019).*

(Continued)

*Primary Examiner* — Luan V Van
*Assistant Examiner* — Alexander R. Parent
(74) *Attorney, Agent, or Firm* — Oblon, McClelland, Maier & Neustadt, L.L.P.

(57) ABSTRACT

A system including an HTE electrolyser, a first steam supply line, a first dihydrogen discharge line, a second dioxygen discharge line, a first heat exchange module configured to ensure a heat exchange between the first steam supply line and the first dihydrogen discharge line, a first module for (Continued)

recovering the thermal energy from the dihydrogen at the outlet of the first heat exchange module in favour of the first supply line, the recovery module comprising a first intermediate exchanger arranged on the first discharge line downstream from the first heat exchange module and configured to transfer the thermal energy from the dihydrogen to an intermediate fluid, and a first intermediate steam generator arranged on the first steam supply line configured to transfer the thermal energy from the intermediate fluid to the liquid water.

11 Claims, 3 Drawing Sheets

(51) Int. Cl.
*C25B 15/021* (2021.01)
*C25B 15/08* (2006.01)

(58) Field of Classification Search
USPC .......................................................... 205/628
See application file for complete search history.

(56) References Cited

U.S. PATENT DOCUMENTS

| | | | | |
|---|---|---|---|---|
| 11,060,196 | B2* | 7/2021 | Colomar | ................. C25B 15/08 |
| 2013/0126360 | A1* | 5/2013 | Ise | ............................ C25B 1/04 |
| | | | | 205/412 |
| 2018/0287179 | A1* | 10/2018 | Rueger | ................... C25B 15/02 |
| 2023/0392265 | A1* | 12/2023 | Winkler | ................. C25B 1/042 |

FOREIGN PATENT DOCUMENTS

| | | |
|---|---|---|
| JP | 6415941 B2 | 10/2018 |
| WO | WO 2019/058579 A1 | 3/2019 |
| WO | WO 2020/180082 A1 | 9/2020 |

OTHER PUBLICATIONS

Sinnott et al. "Chemical Engineering Design (6th Edition)—3.16.6 Heat Pumps" p. 113-114 (2020) Elsevier (Year: 2020).*
International Search Report & Written Opinion Issued Jan. 11, 2023, in PCT/EP2022/072269, filed on Aug. 8, 2022, 11 pages, with English Translation.

* cited by examiner

HIGH TEMPERATURE ELECTROLYSER SYSTEM OPTIMISED BY AN INTERMEDIATE CIRCUIT RECOVERY MODULE

TECHNICAL FIELD OF THE INVENTION

The present invention relates to the field of solid oxide fuel cells (SOFC) and that of high temperature electrolysis (HTE), or also high temperature steam electrolysis (HTSE), also solid oxide electrolyte cell (SOEC). It is particularly applied to optimise the energy consumption of an SOEC electrolyser system.

PRIOR ART

Electrolysis of water is an electrolytic reaction which breaks down water into gaseous dioxygen and dihydrogen using an electric current according to the reaction: $H_2O \rightarrow H_2 + \frac{1}{2}O_2$.

To achieve the electrolysis of water, it is advantageous to perform it at a high temperature, typically between 600 and 950° C., as some of the energy necessary for the reaction can be provided by heat, which is cheaper than electricity, and the activation of the reaction is more effective at a high temperature and does not require a catalyst. A solid oxide electrolyte cell (SOEC) comprises, in particular: —a first porous conductive electrode, or "cathode", intended to be supplied with steam to produce dihydrogen, —a second porous conductive electrode, or "anode", by which the dioxygen produced by the electrolysis of the water injected onto the cathode escapes, and—a solid oxide membrane (dense electrolyte) sandwiched between the cathode and the anode, the membrane being anionic conductive for high temperatures, usually temperatures greater than 600° C. By heating the cell at least to this temperature and by injecting an electric current I between the cathode and the anode, a reduction of water on the cathode thus occurs, which generates dihydrogen ($H_2$) at the cathode and dioxygen at the anode. To implement the high temperature electrolysis, it is known to use an SOEC-type electrolyser, constituted of a stack of elementary units, each comprising a solid oxide electrolyte cell of three anode/electrolyte/cathode layers superposed on one another, and interconnecting plates made of metal alloys, also called bipolar plates, or interconnectors. The interconnectors have the function of ensuring both the passage of the electric current and the circulation of gases in the vicinity of each cell (steam injected, hydrogen and oxygen extracted in an HTE electrolyser; air and hydrogen injected and water extracted in an SOFC cell) and of separating the anode and cathode compartments, which are the gas circulation compartments on the side respectively of the anodes and of the cathodes of the cells.

To achieve electrolysis of steam at a high temperature HTE, steam $H_2O$ is injected into the cathode compartment. Under the effect of the current applied to the cell, the separation of the steam-form water molecules is done at the interface between the hydrogen electrode (cathode) and the electrolyte: this separation produces dihydrogen gas $H_2$ and oxygen ions. The dihydrogen is collected and discharged at the outlet of the hydrogen compartment. The oxygen ions migrate through the electrolyte and recombine in dioxygen $O_2$ at the interface between the electrolyte and the oxygen electrode (anode).

For the effective implementation of electrolysis by the stack, the stack is brought to a temperature greater than 600° C., usually a temperature of between 600° C. and 950° C., the gas supply is switched on at a constant flow rate and a power supply source is connected between two terminals of the stack, in order to make the current I circulate there.

The yield of the transformation of electricity into hydrogen is a key point in order to ensure the competitiveness of the technology. The electric consumption mainly occurs during the electrolysis reaction strictly speaking, but almost 30% of the consumption of the electrolyser comes from the fluid thermal/hydraulic management system, i.e. the architecture external to the electrolyser and the management of fluids and thermal energy in this architecture.

The evaporation of the water used in the electrolyser is the greatest energy consumption of this thermal/hydraulic management system. Conventionally, this function is ensured by an electric steam generator, which consumes 20% of the overall consumption of the electrolyser.

Moreover, generally, a significant portion of energy is discharged into the ambient environment. For example, during the drying phase of the hydrogen and of its compression, it is necessary to deeply cool this mixture, in order to enable the condensation of the water present in the water/hydrogen mixture. This condensation is done mainly at a temperature less than the evaporation temperature of water at the inlet of the electrolyser, which means that a very small portion of this condensation energy can be used.

There is therefore a need to minimise this consumption, by optimising the architecture and the management of the fluids of the system of the electrolyser.

An aim of the present invention is therefore to propose a high temperature electrolyser system optimised by an intermediate circuit recovery module.

Other aims, features and advantages of the present invention will appear upon examining the description below, and the accompanying drawings. It is understood that other advantages can be incorporated.

SUMMARY OF THE INVENTION

To achieve this aim, according to an embodiment, a system is provided, comprising a high temperature electrolyser (HTE), a first supply line for the electrolyser configured to supply the electrolyser with steam,
a first line for discharging the electrolyser configured to discharge dihydrogen from the electrolyser,
a second line for discharging the electrolyser configured to discharge dioxygen from the electrolyser,
a first heat exchange module configured to ensure a heat exchange between the first steam supply line and the first dihydrogen discharge line.

The system being characterised in that it comprises a first module for recovering thermal energy from the dihydrogen at the outlet of the first heat exchange module in favour of the first steam supply line, the recovery module comprising
a first intermediate exchanger arranged on the first discharge line downstream from the first heat exchange module and configured to transfer the thermal energy from the dihydrogen to an intermediate fluid, and
a first intermediate steam generator arranged on the first steam supply line configured to transfer the thermal energy from the intermediate fluid to the liquid water,
a first intermediate fluid circuit configured to receive an intermediate fluid and to ensure the fluid connection between the first intermediate exchanger and the first intermediate steam generator.

This arrangement makes it possible to recover the calories from the dihydrogen produced by the electrolyser in favour of steam production. By the present system, the recovery module enables both the dihydrogen and a steam production. Thus, the electric consumption of the system is highly reduced.

Thus, the system uses heat from the dihydrogen at the outlet of the electrolyser, but preferably after the first heat exchange module, such that the thermal discharging of the dihydrogen is done at a low temperature by a steam generator via an intermediate circuit. The calories recovered from the dihydrogen are reinjected at a temperature greater than the evaporation temperature of the water on the steam supply line and preferably upstream from an electric steam generator.

Advantageously, the use of an intermediate circuit between the first dihydrogen discharge line and the intermediate steam generator makes it possible to have a remote steam generator and not an exchanger between the dihydrogen discharge line, wherein water and dihydrogen circulate. The intermediate circuit has a great modularity of the recovery module, as it also makes it possible to consider to recover the calories at other locations of the system, such as for example, downstream on the dihydrogen discharge line, or also the dioxygen discharge line, and this, without complicating the structure of the recovery module.

The system thus makes it possible to reduce the electric consumption of the system, by increasing the thermal power collected.

The system according to the invention has an improved overall yield of 3% with respect to a conventional configuration.

BRIEF DESCRIPTION OF THE FIGURES

The aims, objectives, as well as the features and advantages of the invention will best emerge from the detailed description of an embodiment of the latter, which is illustrated by the following accompanying drawings, wherein.

Figure 1:
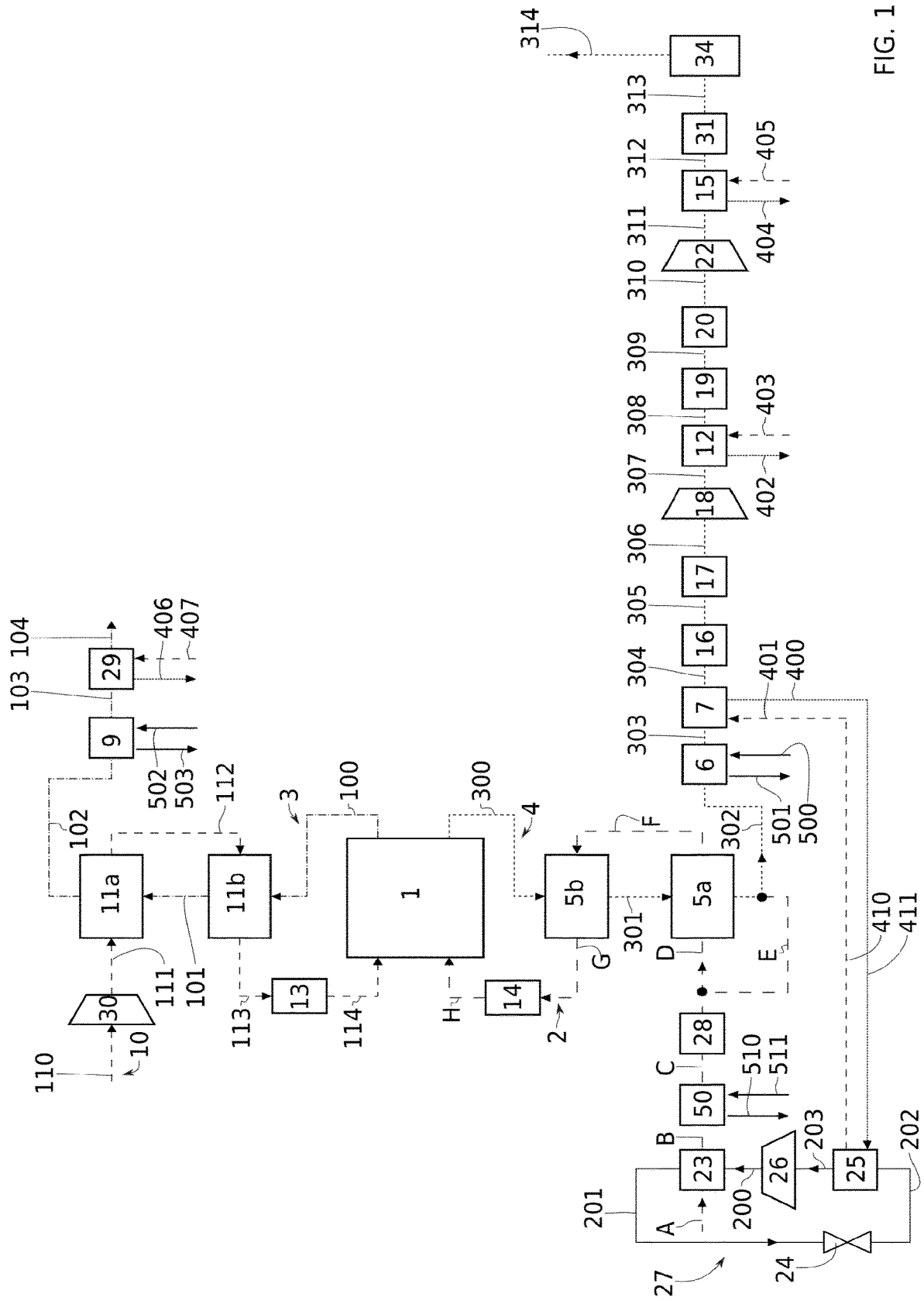
FIG. 1 is a functional diagram representing the system according to a first embodiment of the invention.

The drawings are given as examples and are not limiting of the invention. They constitute principle schematic representations intended to facilitate the understanding of the invention, and are not necessarily to the scale of practical applications.

DETAILED DESCRIPTION OF THE INVENTION

Before starting a detailed review of embodiments of the invention, optional features are stated below, which can optionally be used in association or alternatively:

According to an example, the system comprises a third module for recovering the thermal energy from the dihydrogen at the outlet of the first heat exchange module 5 in favour of the first steam supply line 2, the third recovery module comprising a heat pump and an intermediate circuit, the intermediate circuit comprising:
 a second intermediate exchanger 7 arranged on the first discharge line 2 downstream from the first heat exchange module and configured to transfer the thermal energy from the dihydrogen to an intermediate fluid, and
 a third intermediate fluid circuit 32 configured to receive an intermediate fluid and ensure the fluid connection between the second intermediate exchanger 7 and the heat pump,
the heat pump comprising:
 a fluid circuit 27 configured to receive a heat-transfer fluid,
 an evaporator 25 arranged on the intermediate fluid circuit 32 downstream from the second intermediate exchanger 7 and configured to transfer the thermal energy from the intermediate fluid to the heat-transfer fluid,
 a compressor 26 configured to compress the heat-transfer fluid,
 a condenser 23 arranged on the first steam supply line 2 upstream from the first heat exchange module and configured to transfer the thermal energy from the heat-transfer fluid to the liquid water,
 a reducer 24 configured to reduce the heat-transfer fluid,
 the fluid circuit 27 being configured to fluidically connect the evaporator 25 to the compressor 26, the compressor 26 to the condenser 23, the condenser 23 to the reducer 24 and the reducer 24 to the evaporator 25.

According to an example, the system comprises a fifth intermediate exchanger 12 arranged on the first dihydrogen discharge line 4 downstream from the second intermediate exchanger 7 and in parallel from the second intermediate exchanger 7 on the third intermediate fluid circuit 32 configured to transfer the thermal energy from the dihydrogen to the intermediate fluid.

According to an example, the system comprises a sixth intermediate exchanger 15 arranged on the first dihydrogen discharge line 4 downstream from the fifth intermediate exchanger 12 and in parallel from the second intermediate exchanger 7 and from the fifth heat exchanger 12 on the intermediate fluid circuit 32 configured to transfer the thermal energy from the dihydrogen to the intermediate fluid.

According to an example, the system comprises a electric steam generator 28 arranged on the first steam supply line 2 upstream from the first heat exchange module.

According to an example, the electric steam generator 28 is arranged downstream from the first steam generator 50 and preferably downstream from the condenser 23.

According to an example, the system comprises a second depressed module for recovering the thermal energy from the dihydrogen at the outlet of the first heat exchange module in favour of the first steam supply line 2, the depressed recovery module comprising
 a third intermediate exchanger 8 arranged on the first discharge line 4 downstream from the first heat exchange module and configured to transfer the thermal energy from the dihydrogen to an intermediate fluid,
 a reducer 40 and a compressor 41 arranged upstream from the first heat exchange module on the first steam supply line 2 and defining together a depressed section of the first steam supply line 2,
 a second intermediate steam generator 60 arranged on the depressed portion of the first steam supply line 2 configured to transfer the thermal energy from the intermediate fluid to the liquid water,
 a second intermediate fluid circuit configured to receive an intermediate fluid and ensure the fluid connection between the third intermediate exchanger (8) and the second steam generator 60.

According to an example, the electric steam generator 28 is arranged on the depressed portion downstream from the second steam generator 60 and preferably downstream from the condenser 23.

According to an example, the first steam supply line 2 comprises a main branch on which the steam generator 50 is arranged and a depressed branch comprising the depressed section, the main branch and the depressed branch being arranged in parallel.

According to an example, the system comprises a second supply line 10 of the electrolyser configured to supply the electrolyser 1 with air.

According to an example, the system comprises a second heat exchange module configured to ensure a heat exchange between the second air supply line 10 and the second dioxygen discharge line 3.

According to an example, the system comprises a fourth intermediate heat exchanger 9 arranged between the second dioxygen discharge line 3 and on the first intermediate fluid circuit, in parallel to the first intermediate exchanger 6.

According to an example, the system comprises a seventh intermediate exchanger 29 arranged on the second dioxygen discharge line 3 downstream from the fourth heat exchanger 9 and in parallel from the second intermediate exchanger 7 on the third intermediate fluid circuit 32 configured to transfer the thermal energy from the dioxygen to the intermediate fluid.

According to an option, the system comprises at least one first air cooler or a second heat exchanger arranged on the first dihydrogen discharge line, downstream from the first intermediate exchanger.

According to an option, the system comprises at least one second air cooler or a third heat exchanger arranged on the first dihydrogen discharge line, downstream from the second heat exchanger.

According to an example, the system comprises, downstream from the first air cooler and upstream from the second intermediate exchanger, a liquid/gas separator.

Upstream and downstream, the inlet, the outlet, in a given point are taken in reference to the direction of circulation of the fluid.

By a parameter "substantially equal to/greater than/less than" a given value, this means that this parameter is equal to/greater than/less than the given value, plus or minus 10%, even plus or minus 5%, of this value.

The numbering of first, second, third, etc. n must mean, without limitation, and without link with the necessity to have n−1 or an n+1.

The system according to the invention comprises a high temperature electrolyser (HTE) 1. Preferably, the electrolyser 1 is of the SOEC (solid oxide electrolyte cell) type.

The system comprises several supply and discharge lines connected to the electrolyser 1. Thus, by a pipeline, this means a tube or a set of pipes or tubes which enable the transport of fluid to and from the electrolyser 1.

The system according to the invention comprises a first supply line 2 of the electrolyser 1 capable of supplying the electrolyser 1 with steam. According to an option, the first supply line 2 is configured to provide the electrolyser 1 with steam, by this, this means that the first supply line 2 can provide a mixture of steam and other gas(es), for example, air or dihydrogen or carbon dioxide. Upstream in this first supply line 2, the steam is not yet formed and the first supply line 2 is configured to receive liquid water. According to a preferred option, the first supply line 2 comprises a first portion receiving liquid water and a second portion, downstream from the first portion, receiving steam. Preferably, the first portion is located upstream from a steam generator 28 and the second portion is located downstream from said steam generator 28.

The system according to the invention comprises a first discharge line 4, capable of discharging dihydrogen ($H_2$) from the electrolyser 1. Preferably, the first discharge line 4 receives dihydrogen. The dihydrogen is advantageously produced by the electrolyser 1. The dihydrogen is in gaseous form. The first discharge line 4 can discharge a mixture of dihydrogen and steam, called residual, not having been broken down by the electrolyser 1.

The system according to the invention comprises a second discharge line 3 capable of discharging dioxygen ($O_2$) from the electrolyser 1. Preferably, the second discharge line 3 receives dioxygen. The dioxygen is advantageously produced by the electrolyser 1. The dioxygen is in gaseous form. The second discharge line 3 discharges, according to an option, a dioxygen-enriched gas, for example dioxygen-enriched air.

Below in the description, the first supply line 2 is called first steam supply line 2, the first discharge line 4 is called first dihydrogen discharge line 4 and the second discharge line 3 is called second dioxygen discharge line 3 without being limiting on the gas, the fluid or the mixture being able to be transported in these lines.

According to an option, the system comprises a first heat exchange module configured to ensure a heat exchange between the first steam supply line 2 and the first dihydrogen discharge line 4. This heat exchange module is configured to transfer the calories from the dihydrogen coming from the electrolyser 1 to the water intended to supply the electrolyser 1. A dihydrogen gas flow ensures the increase of temperature of the water flow, all this by also making it possible to cool the discharged dihydrogen flow, and which is advantageously dried and/or compressed in view of its use.

The first heat exchange module comprises, according to an embodiment, at least one heat exchanger 5a configured to ensure the heat transfer of the dihydrogen to the steam. According to a preferred embodiment, the first heat exchange module comprises two heat exchangers 5a, 5b arranged in series between the first supply line 2 and the first discharge line 4. This arrangement makes it possible to provide a second heat exchanger 5b adapted to the temperature of the dihydrogen at the outlet of the electrolyser 1, conventionally around 700° C., and a more usual first heat exchanger 5a adapted to the temperature of the dihydrogen after the passage into a heat exchanger, that is conventionally around 330° C. In this way, the components are optimised for the temperatures and heat transfers to be achieved.

According to an embodiment, the system comprises a second supply line 10, capable of supplying the electrolyser 1 with air. Preferably, the second supply line 10 receives air. According to an option, the second supply line 10 is configured to provide the electrolyser 1 with air, by that, this means that the second supply line 10 can provide air, the air being, for example, a gaseous mixture which makes it possible to scan the cell of the electrolyser 1 and to remove the dioxygen produced by the electrolyser 1.

According to this embodiment, it is advantageous that the system according to the invention comprises a second heat exchange module configured to ensure a heat exchange between the second air supply line 10 and the second dioxygen discharge line 3. This heat exchange module is configured to transfer the calories from the dioxygen coming from electrolyser 1 to the air intended to supply the electrolyser 1. A dioxygen gas flow ensures the increase of the temperature of the air flow, which also makes it possible to cool the discharged dioxygen flow.

The second heat exchange module comprises, according to an embodiment, at least one heat exchanger 11a configured to ensure the heat transfer of the dioxygen to the air. According to a preferred embodiment, the second heat exchange module comprises two heat exchanger 11a, 11b arranged in series between the second supply line 10 and the second discharge line 3. This arrangement makes it possible to provide a second heat exchanger 11b adapted to the temperature of the dioxygen at the outlet of the electrolyser 1, conventionally around 700° C., and a more usual first heat exchanger 11a adapted to the temperature of the dioxygen after the passage into a heat exchanger, that is conventionally around 330° C. In this way, the components are optimised for the temperatures and heat transfers to be achieved.

The system preferably comprises a compressor 30 arranged on the second supply line 10 intended to supply air. The compressor 30 is preferably arranged upstream from the second heat exchange module, if it is present. The compressor 30 is intended to ensure the compression of air intended to be supplied to the electrolyser 1. The compression of air advantageously contributes to increasing the temperature of the air before it enters into the electrolyser 1.

According to an option, the system comprises at least one complementary heat source configured to heat the steam entering into the electrolyser 1 up to a predefined target temperature. The complementary heat source is advantageously arranged on the first steam supply line 2, preferably downstream from the first beat exchange module. The complementary heat source is, for example, an electric heater 14.

According to an option, the system comprises at least one complementary heat source configured to heat the air entering into the electrolyser 1 up to a predefined target temperature. The complementary heat source is advantageously arranged on the second air supply line 10, preferably downstream from the second heat exchange module. The complementary heat source is, for example, an electric heater 13.

Figure 3:
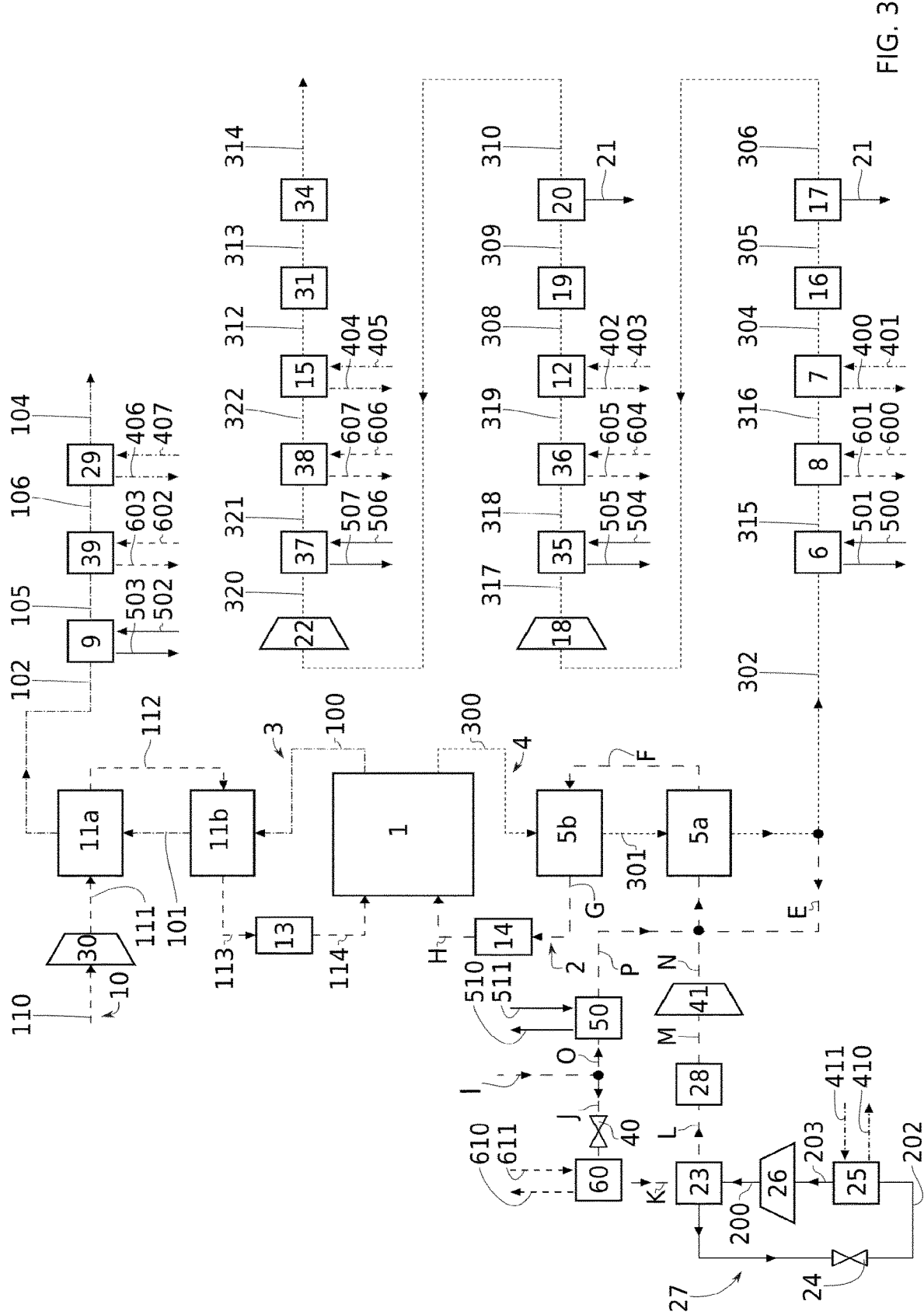
FIG. 3 is a functional diagram representing the system according to a second embodiment of the invention.

According to an option, the system comprises a electric steam generator 28. The electric steam generator 28 is intended to produce steam from liquid water. The electric steam generator 28 is supplied with energy, in particular electric, to ensure the increase of the temperature of the liquid water above its evaporation temperature. The electric steam generator 28 is a component constituting the main energy consumption of an electrolyser system according to the prior art. The electric steam generator 28 is arranged on the first steam supply line 2, preferably upstream from the first heat exchange module. The electric steam generator 28 is arranged preferably downstream from the first intermediate steam generator 50, so as to ensure the evaporation of liquid water before its passes into the electric steam generator 28, which limits the electric consumption. The water at the inlet is advantageously already at least partially in a two-phase state. Conventionally, the water is not 100% in the steam state. The aim of this steam generator 28 is to produce overheated steam. As an example, the evaporation temperature of the liquid water entering into the electric steam generator 28 is around 110° C. or around 70° C. in the case of a depressed steam generator, for example, as illustrated in FIG. 3.

According to an aspect of the invention, the system comprises a module for recovering the thermal energy from the dihydrogen at the outlet of the heat exchange module in favour of the first steam supply line 2.

Advantageously, the recovery module is called first recovery module and comprises a first intermediate exchanger 6, a first intermediate fluid circuit and a first intermediate steam generator 50.

The first intermediate fluid circuit is configured to receive an intermediate fluid and ensures the fluid connection between the first intermediate exchanger 6 and the first intermediate steam generator 50. This intermediate circuit is advantageously a low temperature circuit. By low temperature, this means a temperature of the circulating fluids of between 25° C. and 90° C.

The first intermediate exchanger 6 arranged on the first discharge line 4 preferably downstream from the first heat exchange module, more specifically downstream from the first heat exchanger 5a of the first heat exchange module, configured to transfer the thermal energy from the dihydrogen to the intermediate fluid. The first intermediate exchanger 6 is fluidically connected to the intermediate fluid circuit by a fluid connection 500 ensuring the fluid connection of the first intermediate exchanger 6 to the first intermediate steam generator 50 and by a fluid connection 501 ensuring the fluid connection of the first intermediate steam generator 50 to the first intermediate exchanger 6. As an example, the intermediate fluid entering into the first intermediate exchanger 6 is at a temperature of around the ambient temperature, for example, of between 18 and 30° C. and emerges from said intermediate exchanger 6 at a temperature of around 70° C. Advantageously, the entering fluid is in the two-phase state, i.e. that one portion is in the liquid state and another portion is in the gaseous state.

Figure 2:
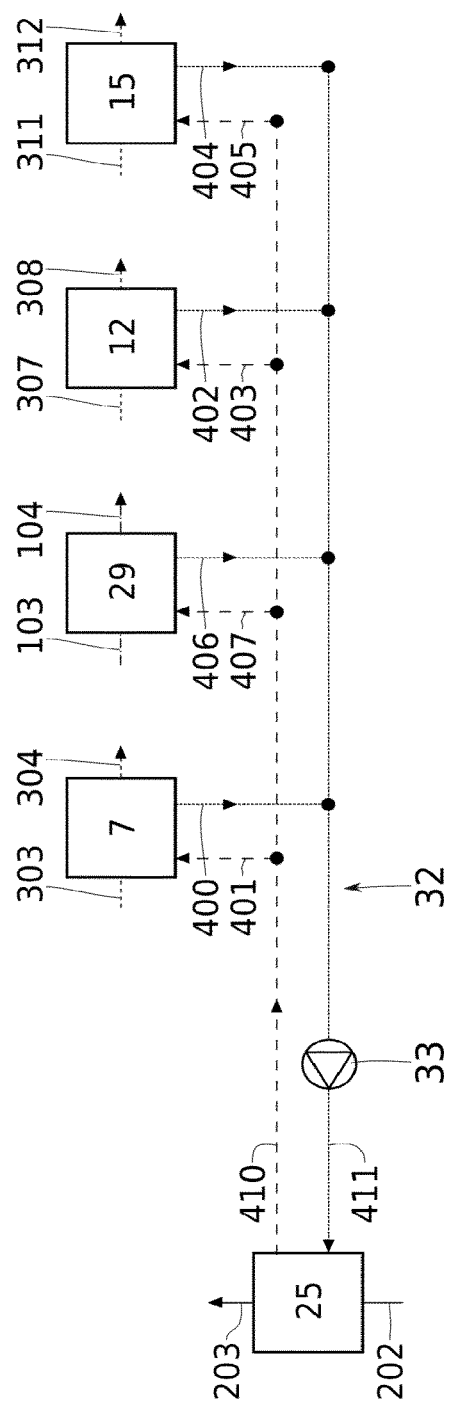
FIG. 2 represents a functional diagram representing an intermediate circuit.

The first fluid circuit is based on the same principle as the third intermediate circuit 32, in particular, illustrated in FIG. 2 and as the second intermediate circuit. Preferably, the first intermediate fluid circuit comprises a main branch 510 arranged between the first intermediate steam generator 50 and the fluid connection 500 configured for the circulation of the intermediate fluid from the first intermediate steam generator 50 to the first intermediate exchanger 6 and a main branch 511 arranged between the fluid connection 501 and the intermediate steam generator 50 configured for the circulation of the intermediate fluid from the first intermediate exchanger 6 to the first intermediate steam generator 50. As an example, the intermediate fluid entering into the first intermediate steam generator 50 is at a temperature of around the ambient temperature is, for example, of between 18 and 30° C. and emerges from said intermediate steam generator 50 at a temperature of around 110° C. for an atmospheric pressure generator and of around 70° C. in the case where the steam generator operates depressed, like for example, illustrated in FIG. 3.

The first intermediate steam generator 50 is configured to transfer the thermal energy from the intermediate fluid to the liquid water circulating in the first steam supply line 2. The intermediate steam generator 50 is arranged on the first steam supply line 2, preferably upstream from the first exchanger 5a of the first heat exchange module. According to a first embodiment, the intermediate steam generator 50 is arranged on the first steam supply line 2 upstream from the electric steam generator 28. According to a second embodiment, the intermediate steam generator 50 is arranged on the first steam supply line 2 in parallel from the electric steam generator 28.

According to an aspect of the invention, the system comprises a second module for recovering the thermal energy from the dihydrogen at the outlet of the heat exchange module in favour of the first steam supply line 2.

According to the invention, the second thermal energy recovery module is a depressed recovery module.

Advantageously, the depressed recovery module comprises an intermediate exchanger 8, called third intermediate exchanger 8, an intermediate fluid circuit called second intermediate fluid circuit, an intermediate steam generator 60 called second intermediate generator, a reducer 40 and a compressor 41.

The reducer 40 and the compressor 41 are arranged on the first steam supply line 1 and define together a depressed section. The depressed section of the first steam supply line 2 extends from the outlet of the reducer 40 to the inlet of the compressor 41. The reducer 40 and the compressor 41 are both arranged on the first steam supply line 2 upstream from the first heat exchange module. The depressed section comprises, according to an embodiment illustrated in FIG. 3, the intermediate steam generator, the fluid connection K, the condenser 23, the fluid connection L, the electric steam generator 28, the fluid connection M.

The second intermediate fluid circuit is configured to receive an intermediate fluid and ensure the fluid connection between the intermediate exchanger 8 and the intermediate steam generator 60. This intermediate circuit is advantageously a low temperature circuit. By low temperature, this means a temperature of the circulating fluids of between 25° C. and 90° C.

The third intermediate heat exchanger 8 is arranged on the first dihydrogen discharge line 4, downstream from the first heat exchange module, more preferably, downstream from the first intermediate exchanger 6, and preferably upstream from a second intermediate exchanger 7, preferably upstream from an optional air cooler 16 and/or liquid/gas separator 17.

The depressed recovery module comprises a second intermediate generator 60 arranged on the first steam supply line, advantageously on the depressed section. Preferably, the intermediate generator 60 is arranged upstream from the condenser 23, which is advantageously arranged on the depressed section in the case where this is present.

The second intermediate steam generator 60 is configured to transfer the thermal energy from the intermediate fluid to the liquid water circulating in the first steam supply line 2. The intermediate steam generator 60 is arranged on the first steam supply line 2 on the depressed section, i.e. between the reducer 40 and the compressor 41. The intermediate steam generator 60 is arranged preferably upstream from the electric steam generator 28. Thus, the depressed recovery module proposes to reduce the pressure in a section of the first steam supply line 2, in order to decrease the boiling point of the water circulating in the first supply line 2. The depressed is then preferably compensated by a recompression up to atmospheric pressure. The section which is depressurised surrounds at least the second intermediate steam generator 60, and preferably also the compressor 23 and/or the electric generator 28.

Preferably, boiling the water is done at a temperature less than the temperature of the thermal discharge of the electrolyser 1 and, in particular, the temperature of the dioxygen and of the dihydrogen, which favours the exchange and therefore the performing of the thermal discharges.

According to an embodiment, the system comprises at least one pump arranged on the first steam supply line 2 configured to move the liquid water in the first supply line 2.

The third heat exchanger 8 is fluidically connected to the second intermediate fluid circuit by a fluid connection 600 ensuring the fluid connection of the third intermediate exchanger 8 to the second intermediate steam generator 60 and by a fluid connection 601 ensuring the fluid connection of the second intermediate steam generator 60 to the intermediate exchanger 8.

Preferably, the intermediate fluid circuit comprises a main branch 610 arranged between the second intermediate steam generator 60 and the fluid connection 600 configured for the circulation of the intermediate fluid from the intermediate steam generator 60 to the third intermediate exchanger 8 and a main branch 611 arranged between the fluid connection 601 and the intermediate steam generator 60 configured for the circulation of the intermediate fluid from the intermediate exchanger 8 to the intermediate steam generator 60. As an example, the intermediate fluid entering into the intermediate steam generator 60 is at a temperature of around 90° C. and emerges from said intermediate steam generator 60 at a temperature of around 35° C.

According to an aspect of the invention, the system comprises a third module for recovering the thermal energy from the dihydrogen at the outlet of the heat exchange module in favour of the first steam supply line 2.

According to an option, the recovery module comprises a heat pump and an intermediate circuit.

Advantageously, the intermediate circuit comprises a third intermediate fluid circuit 32 configured to receive an intermediate fluid and a second intermediate exchanger 7 arranged on the first discharge line 2, preferably downstream from the first heat exchange module, more specifically downstream from the first heat exchanger Sa of the first heat exchange module, configured to transfer the thermal energy from the dihydrogen to the intermediate fluid, preferably downstream from the first intermediate exchanger 6. The third intermediate fluid circuit 32 makes it possible to ensure the fluid connection between the second intermediate exchanger 7 and the heat pump. This third intermediate circuit 32 is advantageously a low temperature circuit. By low temperature, this means a temperature of the circulating fluids of between 25° C. and 90° C.

The second heat exchanger 7 is fluidically connected to the third intermediate fluid circuit 32 by a fluid connection 400 ensuring the fluid connection of the second intermediate exchanger 7 to the evaporator 25 and by a fluid connection 401 ensuring the fluid connection of the evaporator 25 to the second intermediate exchanger 7. As an example, the intermediate fluid entering into the second heat exchanger 7 is at a temperature of around 25° C. and emerges from said second heat exchanger 7 at a temperature of around 70° C. As an example, these temperatures are valid for the different heat exchangers arranged on the first intermediate circuit and on the second intermediate circuit.

Preferably, the third intermediate fluid circuit 32 comprises a main branch 410 arranged between the evaporator 25 and the fluid connection 401 configured for the circulation of the intermediate fluid from the evaporator 25 to the intermediate exchanger and a main branch 411 arranged between the fluid connection 400 and the evaporator 25 configured for the circulation of the intermediate fluid from the intermediate exchanger to the evaporator 25. As an example, the intermediate fluid entering into the evaporator 25 is at a temperature of around 90° C. and emerges from said evaporator 25 at a temperature of around 35° C.

The heat pump is configured to transfer the thermal energy from the intermediate fluid to the liquid water circulating in the first steam supply line 2.

The heat pump comprises a condenser 23, a reducer 24, at least one evaporator 25, and a compressor 26. The heat pump comprises a fluid circuit 27 capable of receiving a heat-transfer fluid.

The heat-transfer fluid is, for example, a fluid conventionally used in heat pumps such as 1234yf: 2,3,3,3-tetrafluoropropene (HFO-1234yf), or R245FA pentafluoropropane, or R290 propane.

The fluid circuit 27 ensures the fluid connection of the components of the heat pump, preferably in a closed circuit.

According to an embodiment, the fluid circuit 27 comprises a fluid connection 200 connected between the outlet of the compressor 26 and the inlet of the condenser 23. Advantageously, the fluid circuit 27 comprises a fluid connection 201 connected between the outlet of the condenser 23 and the inlet of the reducer 24. Advantageously, the fluid circuit 27 comprises a fluid connection 202 connected between the outlet of the reducer 24 and the inlet of the evaporator 25. Advantageously, the fluid circuit 27 comprises a fluid connection 203 connected between the outlet of the evaporator 25 and the inlet of the compressor 26.

According to the invention, the condenser 23 of the heat pump is arranged on the first steam supply line 2, preferably upstream from the first intermediate steam generator 50 or from the outlet fluid connection of the first intermediate steam generator 50. This arrangement makes it possible to transmit calories from the heat-transfer fluid in favour of the liquid water circulating in the first supply line 2 upstream from the first intermediate steam generator 50, and preferably upstream from the electric steam generator 28. As an example, the water entering into the condenser 23 is at a temperature of around the ambient temperature in the embodiment at atmospheric pressure, such as for example, illustrated in FIG. 1 and emerges from said condenser 23, a temperature of around 110° C., or the water entering into the condenser 23 is at a temperature of around 70° C., advantageously, in the two-phase state in the depressed embodiment, such as, for example, illustrated in FIG. 3, and emerges from said condenser 23, a temperature of around 75° C.

The present invention makes it possible to utilise the waste heat from the system, and more specifically, the thermal discharges of the dihydrogen produced. The heat pump is an active system making it possible to reinject, upstream from the first intermediate steam generator 50, and preferably upstream from the electric steam generator 28, and at a temperature greater than the evaporation temperature of the water, the calories collected on the dihydrogen produced.

According to an embodiment, the first recovery module of the system comprises a fourth intermediate heat exchanger 9 arranged on the first steam supply line 2 and on the second dioxygen discharge line 3. The fourth intermediate heat exchanger 9 is preferably arranged on the second discharge line 3. This fourth intermediate heat exchanger 9 is configured to ensure the heat transfer of calories collected on the dioxygen flow discharged from the electrolyser 1 and circulating in the second discharge line 3 in favour of the steam supply line 2 by way of the first intermediate fluid circuit and of the first intermediate steam generator 50.

The fourth heat exchanger 9 is fluidically connected to the intermediate fluid circuit by a fluid connection 503 ensuring the fluid connection of the fourth intermediate exchanger 9 to the first steam generator 50 and by a fluid connection 502 ensuring the fluid connection of the first steam generator 50 to the fourth intermediate exchanger 9.

Preferably, the fluid connection 503 is fluidically connected to the main branch 511 configured for the circulation of the intermediate fluid from the intermediate exchanger 9 to the first steam generator 50. Preferably, the fluid connection 502 is fluidically connected to the main branch 510 configured for the circulation of the intermediate fluid to the intermediate exchanger 9.

The fourth intermediate exchanger 9 is advantageously arranged in parallel from the first intermediate exchanger 6.

According to a preferred embodiment, the third recovery module and more specifically the intermediate circuit comprises a seventh intermediate exchanger 29 arranged on the second dihydrogen discharge line 3. The seventh intermediate exchanger 29 is a heat exchanger configured to ensure the transfer of calories from the dihydrogen discharged from the electrolyser 1 in favour of the intermediate fluid in view of being used in the heat pump of the third recovery module.

The seventh heat exchanger 29 is fluidically connected to the intermediate fluid circuit 32 by a fluid connection 406 ensuring the fluid connection of the seventh intermediate exchanger 29 to the evaporator 25 and by a fluid connection 407 ensuring the fluid connection of the evaporator 25 to the seventh intermediate exchanger 29.

Preferably, the fluid connection 406 is fluidically connected to the main branch 411 configured for the circulation of the intermediate fluid from the intermediate exchanger to the evaporator 25. Preferably, the fluid connection 407 is fluidically connected to the main branch 410 configured for the circulation of the intermediate fluid to the intermediate exchanger.

According to an embodiment, the second system recovery module comprises a twelfth intermediate heat exchanger 39 arranged on the second dioxygen discharge line 3 and on the second intermediate circuit. This twelfth intermediate heat exchanger 39 is configured to ensure the thermal transfer of calories collected on the dioxygen flow discharged from the electrolyser 1 and circulating in the second discharge line 3 in favour of the steam supply line 2 by way of the second intermediate fluid circuit and of the second intermediate steam generator 60.

The twelfth heat exchanger 39 is fluidically connected to the intermediate fluid circuit by a fluid connection 603 ensuring the fluid connection of the twelfth intermediate exchanger 39 to the second steam generator 60 and by a fluid connection 602 ensuring the fluid connection of the second steam generator 60 to the twelfth intermediate exchanger 39.

Preferably, the fluid connection 603 is fluidically connected to the main branch configured for the circulation of the intermediate fluid from the intermediate exchanger 39 to the second steam generator 60. Preferably, the fluid connection 602 is fluidically connected to the main branch configured for the circulation of the intermediate fluid to the intermediate exchanger 39.

The twelfth intermediate exchanger 39 is advantageously arranged in parallel from the third intermediate exchanger 8.

According to an embodiment, the system comprises means for treating the dihydrogen flow produced. The dihydrogen produced by the electrolyser 1 and which emerges from it through the first discharge line 4 first has a very high temperature corresponding to the reaction temperature of the electrolyser 1. Yet, in view of its use, the dihydrogen must preferably be returned to a temperature close to the ambient temperature. Moreover, the dihydrogen discharged from the electrolyser 1 through the first discharge line 4 can comprise the steam removed with the dihydrogen flow. It is therefore also preferred to separate the dihydrogen from the possible steam removed with it, by drying it.

The system according to the invention advantageously comprises, to this end, a first treatment stage intended for the drying and/or the compression of the dihydrogen produced.

Advantageously, the first treatment stage is advantageously arranged downstream from the second intermediate exchanger 7 of the third recovery module.

According to an option, the first treatment stage comprises a heat exchanger, the heat exchanger is arranged on the first discharge line 4, preferably downstream from the intermediate exchanger 7. This heat exchanger is, according to a first option, an air cooler 16, i.e. a heat exchanger between a fluid and a gas, the gas being moved through a fan. According to another option, the heat exchanger is a standard cooler, i.e. without a fan, this solution however being less effective. According to the option not represented in the figures, the heat exchanger ensures the heat exchange between the fluid and a gas and, in particular, the air intended to supply the electrolyser 1.

The first treatment stage advantageously comprises a liquid/gas separator 17 arranged downstream from the air cooler 16. The separator 17 makes it possible to separate the liquid water from the gaseous dihydrogen, the liquid water resulting from the cooling of the steam in the air cooler 16 below its condensation point.

According to a preferred option, the system comprises a second treatment stage arranged downstream from the first treatment stage on the first discharge line 4. The second treatment stage makes it possible to complete the drying of the dihydrogen. The second treatment stage advantageously comprises a heat exchanger which, like for the first stage, can be a standard cooler, an air cooler 19 or third heat exchanger between a fluid (dihydrogen) and the air intended to supply the electrolyser 1. The second stage comprises a liquid/gas separator 20. Preferably, the system comprises, between the first treatment stage and the second treatment stage, a compressor 18 configured to enable the second treatment by the air cooler 19 by increasing beforehand the temperature of the mixture, so as to be able to cool it again.

Coming from the first treatment stage and/or the second treatment stage, if present, the liquid water is preferably recycled by being returned to the first steam supply line 2 through a water recycling line 21. The water recycling line is fluidically connected to the first supply line 2, preferably upstream from the first intermediate generator 50. The dihydrogen is itself used and, in particular, stored after conventional treatments.

The system preferably comprises a pump on the water recycling line 21. The pump is configured to move the liquid water circulating in the water recycling line 21 and coming from, in particular, gas/liquid separators 17, 20.

According to a preferred embodiment of the invention, the third recovery module is more specifically the intermediate circuit comprises an intermediate exchanger arranged at a treatment stage, preferably at each treatment stage.

The intermediate circuit of the third recovery module advantageously comprises an intermediate exchanger 12 called fifth intermediate exchanger 12 without being limiting or in line with the necessity to have another intermediate exchanger. The fifth intermediate exchanger 12 is arranged preferably downstream from the compressor 18 and preferably upstream from the air cooler 19.

The intermediate circuit of the third recovery module advantageously comprises an intermediate exchanger 15 called sixth intermediate exchanger 15 without being limiting or in line with the necessity to have another intermediate exchanger. The sixth intermediate exchanger 15 is arranged preferably downstream from the compressor 22 and preferably upstream from the air cooler 31.

If the system comprises other types of treatment downstream from the second treatment stage, the third recovery module can comprise an nth intermediate exchanger, arranged at this other treatment stage advantageously downstream from a compressor and upstream from an air cooler.

According to an embodiment of the invention, the intermediate exchangers of the intermediate circuit are arranged on the intermediate fluid circuit in parallel with one another, as illustrated in FIG. 2. This arrangement greatly facilitates the modularity of the system and of the number of intermediate exchangers used.

The fifth intermediate exchanger 12 is fluidically connected to the main branch 410 by a fluid connection 403 and to the main branch 411 by a fluid connection 402.

The sixth intermediate exchanger 15 is fluidically connected to the main branch 410 by a fluid connection 405 and to the main branch 411 by a fluid connection 404.

According to an option not represented, the system comprises an intermediate exchanger arranged on a cold heat source external to the system, such as, for example, a thermal discharge source.

According to a preferred embodiment of the invention, the first recovery module, and more specifically the intermediate fluid circuit, comprises an intermediate exchanger arranged at a treatment stage, preferably at each treatment stage.

The first recovery module advantageously comprises an intermediate exchanger 35 called eighth intermediate exchanger 35 without being limiting or in line with the necessity to have another intermediate exchanger. The eighth intermediate exchanger 35 is arranged preferably downstream from the compressor 18 and preferably upstream from the air cooler 19.

The first recovery module advantageously comprises an intermediate exchanger 37 called tenth intermediate exchanger 37 without being limiting or in line with the necessity to have another intermediate exchanger. The tenth intermediate exchanger 37 is arranged preferably downstream from the compressor 22 and preferably upstream from the air cooler 31.

If the system comprises other treatment stages downstream from the second treatment stage, the third recovery module can comprise an nth intermediate exchanger arranged at this other treatment stage, advantageously downstream from a compressor and upstream from an air cooler.

According to an embodiment of the invention, the intermediate exchangers of the intermediate circuit are arranged on the intermediate fluid circuit in parallel with one another, as illustrated in FIG. 2 for the fluid circuit 32. This arrangement greatly facilitates the modularity of the system and of the number of intermediate exchangers used.

The eighth intermediate exchanger 35 is fluidically connected to the main branch 510 by a fluid connection 504 and to the main branch 511 by a fluid connection 505.

The tenth intermediate exchanger 37 is fluidically connected to the main branch 510 by a fluid connection 506 and to the main branch 511 by a fluid connection 507.

According to a preferred embodiment of the invention, the second recovery modules, and more specifically the intermediate fluid circuit comprises an intermediate exchanger arranged at a treatment stage, preferably at each treatment stage.

The second recovery module advantageously comprises an intermediate exchanger 36 called ninth intermediate exchanger 36 without being limiting or in line with the necessity to have another intermediate exchanger. The ninth intermediate exchanger 36 is arranged preferably downstream from the compressor 18 and preferably upstream from the air cooler 19.

The second recovery module advantageously comprises an intermediate exchanger 38 called eleventh intermediate exchanger 38 without being limiting or in line with the necessity to have another intermediate exchanger. The eleventh intermediate exchanger 38 is arranged preferably downstream from the compressor 22 and preferably upstream from the air cooler 31.

If the system comprises other treatment stages downstream from the second treatment stage, the third recovery module can comprise an nth intermediate exchanger arranged at this other treatment stage, advantageously downstream from a compressor and upstream from an air cooler.

According to an embodiment of the invention, the intermediate exchangers of the intermediate circuit are arranged on the intermediate fluid circuit in parallel with one another, as illustrated in FIG. 2 for the fluid circuit 32. This arrangement greatly facilitates the modularity of the system and of the number of intermediate exchangers used.

The ninth intermediate exchanger 36 is fluidically connected to the main branch 610 by a fluid connection 604 and to the main branch 611 by a fluid connection 605.

The eleventh intermediate exchanger 38 is fluidically connected to the main branch 610 by a fluid connection 606 and to the main branch 611 by a fluid connection 607.

The electrolyser 1 receives steam and advantageously air and discharges dihydrogen and dioxygen.

The fluid connections are preferably direct, according to an option of additional members can be integrated, by respecting the relative positioning of the components mentioned below.

Preferably, the electrolyser 1 is fluidically connected to the first steam supply line 2. The first steam supply line 2 ensures the fluid connection of components arranged upstream from the electrolyser 1 on said supply line 2. The description below is made by starting upstream from the electrolyser 1 and by following the direction of circulation of the water and/or the steam in the first supply line 2.

According to the embodiment illustrated in FIG. 1, the first supply line 2 ensures the fluid connection to the inlet of the condenser 23, then the fluid connection from the outlet of the condenser 23 to the inlet of the first intermediate steam generator 50, the fluid connection from the outlet from the first intermediate steam generator 50 to the inlet of the electric steam generator 28, then the fluid connection from the outlet of the electric steam generator 28 to the inlet of the first heat exchange module, preferably to the first heat exchanger 5a, then the fluid connection from the outlet of the first heat exchanger 5a to the inlet of the second heat exchanger 5b, then the fluid connection from the outlet of the second heat exchanger 5b to the inlet of the electric heater 14, then the fluid connection from the outlet of the electric heater 14 to the inlet of the electrolyser 1.

According to the embodiment illustrated in FIG. 2, the water inlet supplies two parallel branches. A first branch corresponding to the depressed portion, advantageously comprising, a fluid connection J, ensuring the liquid water inlet in the reducer 40, then the fluid connection from the outlet of the reducer 40 to the inlet of the low pressure second intermediate steam generator 60, then the fluid connection from the outlet of the second intermediate steam generator 60 advantageously to the inlet of the condenser 23 if present, then the fluid connection from the outlet of the condenser 23 to the inlet of the electric steam generator 28, then the fluid connection from the outlet of the electric steam generator 28 to the inlet of the compressor 41. A second branch corresponding to the atmospheric pressure supply line and advantageously comprising a fluid connection O ensuring the liquid water inlet in the first intermediate generator 50, then a fluid connection P ensuring the outlet of the steam from the first intermediate generator 50 and advantageously the connection with the outlet fluid connection N of the compressor 41 thus opening into the inlet of the heat exchange module.

Preferably, the electrolyser 1 is fluidically connected to a first dihydrogen discharge line 4. The first discharge line 4 ensures the fluid connection of components arranged downstream from the electrolyser 1 on said first discharge line 4. The description below is made by starting with the electrolyser 1 and by following the direction of circulation in the first discharge line 4 from the electrolyser 1.

According to the embodiment illustrated in FIG. 1, the first discharge line 4 ensures the fluid connection of the electrolyser 1 with the inlet of the first heat exchange module, more preferably with the second heat exchanger 5b, then the fluid connection of the second heat exchanger 5b to the first heat exchanger 5a, then the fluid connection of the first heat exchanger 5a to the inlet of the first intermediate exchanger 6, then the fluid connection from the outlet of the first intermediate exchanger 6 to the inlet of the second intermediate exchanger 7, then the fluid connection from the outlet of the second intermediate exchanger 7 to the inlet of the air cooler 16, then the fluid connection from the inlet of the air cooler to the inlet of the liquid/gas separator 17, then the fluid connection from the outlet of the liquid/gas separator 17 to the inlet of the compressor 18, then advantageously the fluid connection from the outlet of the compressor 18 to the inlet of the fifth intermediate exchanger 12, then the fluid connection from the fifth intermediate exchanger 12 to the air cooler 19, then the fluid connection from the air cooler 19 to the liquid/gas separator 20, advantageously, the fluid connection from the outlet of the liquid/gas separator 20 to the inlet of the compressor 22, then the fluid connection from the outlet of the compressor to the inlet of a sixth heat exchanger 15, then the fluid connection from the outlet of the sixth heat exchanger 15 to the inlet of an air cooler 31, then the fluid connection from the outlet of the air cooler 31 to the inlet of the separator 34, then from the outlet of the separator 34 directly or indirectly to the dihydrogen storage.

According to an embodiment illustrated in FIG. 2, the first discharge line 4 ensures the fluid connection of the electrolyser 1 with the inlet of the first heat exchanger module, more preferably with the second heat exchanger 5b, then the fluid connection of the second heat exchanger 5b to the first heat exchanger 5a, then the fluid connection from the first heat exchanger 5a to the inlet of the first intermediate exchanger 6, then the fluid connection from the outlet of the first intermediate exchanger 6 to the inlet of the third intermediate exchanger 8, then the fluid connection from the outlet of the third intermediate exchanger 8 to the inlet of the second intermediate exchanger 7, then the fluid connection from the outlet of the second intermediate exchanger 7 to the inlet of the air cooler 16, then the fluid connection from the inlet of the air cooler to the inlet of the liquid/gas separator 17, then the fluid connection from the outlet of the liquid/gas separator 17 to the inlet of the compressor 18, then advantageously the fluid connection from the outlet of the compressor 18 to the inlet of the eighth intermediate exchanger 35, then the fluid connection from the outlet of the eighth intermediate exchanger 35 to the inlet of the ninth intermediate exchanger 36, then the fluid connection from the outlet of the ninth intermediate exchanger 36 to the inlet of the fifth intermediate exchanger 12, then the fluid connection of the fifth intermediate exchanger 12 to the air cooler 19, then the fluid connection of the air cooler 19 to the liquid/gas separator 20, advantageously, the fluid connection from the outlet of the compressor to the inlet of the tenth intermediate exchanger 37, then the fluid connection from the outlet of the tenth intermediate exchanger 37 to the inlet of the eleventh intermediate exchanger 38, then the fluid connection from the outlet of the eleventh intermediate exchanger 38 to the inlet of the sixth heat exchanger 15, then the fluid connection from the outlet of the sixth heat exchanger 15 to the inlet of an air cooler 31, then the fluid connection from the outlet of the air cooler 31 to the inlet of the separator 34, then from the outlet of the separator 34 directly or indirectly to the dihydrogen storage.

Preferably, the electrolyser 1 is fluidically connected to a second dioxygen discharge line 3. The second discharge line 3 ensures the fluid connection of components arranged downstream from the electrolyser 1 on said second discharge line 3. The description below is made by starting with the electrolyser 1 and by following the direction of circulation in the second discharge line 3 from the electrolyser 1. The second discharge line 3 ensures the fluid connection of the electrolyser 1 with the second heat exchange module, more preferably with the second heat exchanger 11b, then the fluid connection of the second heat exchanger 11b to the first heat exchanger 11a, then the fluid connection of the first heat exchanger 11a to the inlet of the fourth intermediate exchanger 9 to the inlet of the seventh intermediate exchanger 29, then a fluid connection from the outlet of the seventh intermediate exchanger 29 according to the embodiment illustrated in FIG. 1, or according to the embodiment illustrated in FIG. 2, the fluid connection from the outlet of the fourth intermediate exchanger 9 to the inlet of the twelfth intermediate exchanger 39, then the fluid connection from the outlet of the twelfth intermediate exchanger 39 to the inlet of the seventh intermediate exchanger 29, then a fluid connection from the outlet of the seventh intermediate exchanger 29.

Preferably, the electrolyser 1 is fluidically connected to the second air supply line 10. The second supply line 10 ensures the fluid connection of components arranged upstream from the electrolyser 1 on said second supply line 10. The second supply line 10 ensures the fluid connection of the compressor 30 to the first heat exchanger 11a, then the fluid connection of the first heat exchanger 11a to the second heat exchanger 11b, then the fluid connection of the second heat exchanger 11b to the electric heater 13, then the fluid connection of the electric heater 13 to the electrolyser 1. According to an option not represented, upstream from the compressor 30, the second supply line ensures the fluid connection of a heat exchanger replacing the air cooler 16 and/or 19 to the compressor 30.

The intermediate circuit such as illustrated in FIG. 2 comprises an intermediate fluid circuit 32 ensuring the fluid connection of the intermediate exchanger(s) 7, 12, 15, 29, and the heat pump, more specifically, the evaporator 28. According to the embodiment, wherein there are several intermediate exchangers 7, 12, 15, 29, they are arranged in parallel to one another. The intermediate fluid circuit 32 advantageously comprises a pump 33 intended to circulate the intermediate fluid in the intermediate fluid circuit 32.

The system advantageously comprises fluid connections described below.

Concerning the first supply line 2, according to the embodiment illustrated in FIG. 1, it advantageously comprises a fluid connection A connected to the inlet of the condenser 23. The fluid connection A makes it possible to introduce water into the condenser 23, in particular being able to come from the recycling water circulating in the recycling line 21.

Advantageously, the first supply line 2 comprises a fluid connection B connected between the outlet of the condenser 23 and the inlet of the first intermediate steam generator 50.

Advantageously, the first supply line 2 comprises a fluid connection C connected between the outlet of the first intermediate steam generator 50 to the inlet of the electric steam generator 28.

Advantageously, the first supply line 2 comprises a fluid connection D connected between the outlet of the electric steam generator 28 and the inlet of the first heat exchanger 5a of the heat exchange module.

Advantageously, the first supply line 2 comprises a fluid connection E connected between the outlet of the first heat exchanger 5a of the heat exchange module and the inlet of the first heat exchanger Sa of the heat exchange module, enabling a recirculation of the water coming from the ten-hour electrolysis is removed with the hydrogen fluid.

Advantageously, the first supply line 2 comprises a fluid connection F connected between the outlet of the first heat exchanger 5a and the inlet of the second heat exchanger 5b.

Advantageously, the first supply line 2 comprises a fluid connection G connected between the outlet of the second heat exchanger 5b and the inlet of the heater 14.

Advantageously, the first supply line 2 comprises a fluid connection H connected between the outlet of the electric heater 14 and the inlet of the electrolyser 1.

Concerning the first supply line 2, according to the embodiment illustrated in FIG. 1, it advantageously comprises, a fluid connection I providing water to the supply line 2. The fluid connection I makes it possible to supply two parallel branches with water, the depressed section and the branch of which comprising the first intermediate steam generator 50.

Advantageously, the first supply line 2 comprises a fluid connection I ensuring the fluid connection J between the fluid connection I and the inlet of the second intermediate steam generator 60. The fluid connection J comprises the reducer 40.

Advantageously, the first supply line 2 comprises a fluid connection K ensuring the fluid connection between the outlet of the second steam generator 60 and the inlet of the condenser 23.

Advantageously, the first supply line 2 comprises a fluid connection L ensuring the connection between the outlet of the condenser 23 and the inlet of the electric generator 28.

Advantageously, the first supply line 2 comprises a fluid connection M ensuring the fluid connection between the outlet of the electric generator 28 and the inlet of the compressor 41.

Advantageously, the first supply line 2 comprises a fluid connection N ensuring the fluid connection between the outlet of the compressor 22 and the inlet of the first heat exchanger 5a.

Advantageously, the first supply line 2 comprises a fluid connection O ensuring the fluid connection between the fluid connection I and the inlet of the first intermediate steam generator 50.

Advantageously, the first supply line 2 comprises a fluid connection P ensuring the fluid connection between the outlet of the first intermediate steam generator 50 and the fluid connection N.

Advantageously, the first supply line 2 comprises a fluid connection F connected between the outlet of the first heat exchanger 5a and the inlet of the second heat exchanger 5b.

Advantageously, the first supply line 2 comprises a fluid connection G connected between the outlet of the second heat exchanger 5b and the inlet of the heater 14.

Advantageously, the first supply line 2 comprises a fluid connection H connected between the outlet of the electric heater 14 and the inlet of the electrolyser 1.

Concerning the first discharge line 4, it advantageously comprises a first fluid connection 300 between the outlet of the electrolyser 1 and the inlet of the second heat exchanger 5b of the first heat exchange module.

Advantageously, the first discharge line 4 comprises a fluid connection 301 between the outlet of the outlet of the second heat exchanger 5b of the first heat exchange module and the inlet of the first heat exchanger 5a of the first heat exchange module.

Advantageously, the first discharge line 4 comprises a fluid connection 302 between the outlet of the first heat exchanger 5a and the inlet of the steam-generator first intermediate exchanger 6.

According to the embodiment illustrated in FIG. 1:

Advantageously, the first discharge line 4 comprises a fluid connection 303 between the outlet of the first intermediate exchanger 6 and the inlet in the first intermediate exchanger 7.

Advantageously, the first discharge line 4 comprises a fluid connection 304 between the outlet of the second intermediate exchanger 7 and the inlet of the first air cooler 16.

Advantageously, the first discharge line 4 comprises a fluid connection 305 between the outlet of the first air cooler 16 and the inlet of the separator 17.

Advantageously, the first discharge line 4 comprises a fluid connection 306 between the outlet of the separator 17 and the inlet of the compressor 18.

Advantageously, the first discharge line 4 comprises a fluid connection 307 between the outlet of the compressor 18 and the inlet of the fifth intermediate exchanger 12.

Advantageously, the first discharge line 4 comprises a fluid connection 308 between the outlet of the fifth intermediate exchanger 12 and the inlet of the air cooler 19.

Advantageously, the first discharge line 4 comprises a fluid connection 309 between the outlet of the air cooler 19 and the inlet of the separator 20.

Advantageously, the first discharge line 4 comprises a fluid connection 310 between the outlet of the separator 20 and the inlet of the compressor 30.

Advantageously, the first discharge line 4 comprises a fluid connection 311 between the outlet of the compressor 30 and the inlet of the sixth intermediate exchanger 15.

Advantageously, the first discharge line 4 comprises a fluid connection 312 between the outlet of the sixth intermediate exchanger 15 and the inlet of the air cooler 31.

Advantageously, the first discharge line 4 comprises a fluid connection 313 between the outlet of the air cooler 31 and the inlet of the separator 34.

Advantageously, the first discharge line 4 comprises a fluid connection 314 ensuring the outlet of dihydrogen from the separator 34.

According to an embodiment illustrated in FIG. 2:

advantageously, the first discharge line 4 comprises a fluid connection 315 between the outlet of the first intermediate exchanger 6 and the inlet of the third intermediate exchanger 8;

advantageously, the first discharge line 4 comprises a fluid connection 316 between the outlet of the third intermediate exchanger 8 and the inlet of the second intermediate exchanger 7.

Advantageously, the first discharge line 4 comprises a fluid connection 304 between the outlet of the second intermediate exchanger 7 and the inlet of the first air cooler 16.

Advantageously, the first discharge line 4 comprises a fluid connection 305 between the outlet of the first air cooler 16 and the inlet of the separator 17.

Advantageously, the first discharge line 4 comprises a fluid connection 306 between the outlet of the separator 17 and the inlet of the compressor 18.

Advantageously, the first discharge line 4 comprises a fluid connection 317 between the outlet of the compressor 18 and the inlet of the eighth intermediate exchanger 35.

Advantageously, the first discharge line 4 comprises a fluid connection 318 between the outlet of the eighth intermediate exchanger 35 and the inlet of the ninth intermediate exchanger 36.

Advantageously, the first discharge line 4 comprises a fluid connection 319 between the outlet of the ninth intermediate exchanger 36 and the inlet of the fifth intermediate exchanger 12.

Advantageously, the first discharge line 4 comprises a fluid connection 308 between the outlet of the fifth intermediate exchanger 12 and the inlet of the air cooler 19.

Advantageously, the first discharge line 4 comprises a fluid connection 309 between the outlet of the air cooler 19 and the inlet of the separator 20.

Advantageously, the first discharge line 4 comprises a fluid connection 310 between the outlet of the separator 20 and the inlet of the compressor 30.

Advantageously, the first discharge line 4 comprises a fluid connection 320 between the outlet of the compressor 22 and the inlet of the tenth intermediate exchanger 37.

Advantageously, the first discharge line 4 comprises a fluid connection 321 between the outlet of the tenth intermediate exchanger 37 and the inlet of the eleventh intermediate exchanger 38.

Advantageously, the first discharge line 4 comprises a fluid connection 322 between the outlet of the eleventh intermediate exchanger 38 and the inlet of the sixth intermediate exchanger 15.

Advantageously, the first discharge line 4 comprises a fluid connection 312 between the outlet of the sixth intermediate exchanger 15 and the inlet of the air cooler 31.

Advantageously, the first discharge line 4 comprises a fluid connection 313 between the outlet of the air cooler 31 and the inlet of the separator 34.

Advantageously, the first discharge line 4 comprises a fluid connection 314 ensuring the outlet of dihydrogen from the separator 34.

Concerning the second dioxygen discharge line 3, it advantageously comprises a fluid connection 100 between the outlet of the electrolyser 1 and the inlet of the second heat exchanger 11b of the second heat exchange module.

Advantageously, the second discharge line 3 comprises a fluid connection 101 between the outlet of the second heat exchanger 11b and the inlet of the first heat exchanger 11a of the second heat exchange module.

Advantageously, the second discharge line 3 comprises a fluid connection 102 between the outlet of the first heat exchanger 11a and the inlet of the heat exchanger 9.

According to the embodiment illustrated in FIG. 1, advantageously, the second discharge line 3 comprises a fluid connection 103 between the outlet of the heat exchanger 9 and the inlet of the seventh intermediate exchanger 29. Advantageously, the second discharge line 3 comprises a fluid connection 104 between the outlet of the seventh intermediate exchanger 29 and the outside.

According to the embodiment illustrated in FIG. 2, advantageously, the second discharge line 3 comprises a fluid connection 105 between the outlet of the heat exchanger 9 and the inlet of the twelfth intermediate exchanger 39. Advantageously, the second discharge line 3 comprises a fluid connection 106 between the outlet of the twelfth intermediate exchanger 39 and the inlet of the seventh intermediate exchanger 29. Advantageously, the second discharge line 3 comprises a fluid connection 104 between the outlet of the seventh intermediate exchanger 29 and the outside.

Concerning the second air supply line 10, it comprises, according to an option not represented, a fluid connection 110 between the outlet of a heat exchanger replacing the air cooler 16 and the inlet of the compressor 30.

Advantageously, the second supply line 10 comprises a fluid connection 111 between the outlet of the compressor 30 and the inlet of the first heat exchanger 11a of the second heat exchange module.

Advantageously, the second supply line 10 comprises a fluid connection 112 between the outlet of the first heat exchanger 11a and the inlet of the second heat exchanger 11b of the second heat exchange module.

Advantageously, the second supply line 10 comprises a fluid connection 113 between the outlet of the second heat exchanger 11b and the inlet of the electric heater 13.

Advantageously, the second supply line 10 comprises a fluid connection 114 between the outlet of the electric heater 13 and the inlet of the electrolyser 1.

In operation, according to the first embodiment illustrated in FIG. 1, the liquid water arrives in the first steam supply line 2, more specifically in the first portion by the fluid connection A. The fluid connection A is advantageously connected to the inlet of the condenser 23. The liquid water penetrates into the condenser 23. The temperature of the water increases by transfer of calories from the heat-transfer fluid of the heat pump in favour of the liquid water. In the condenser 23, the heat-transfer fluid transmits its calories to the water, which ensures the condensation of the heat-transfer fluid in the condenser 23. The heated liquid water exits from the condenser 23 by the fluid connection B at a temperature, advantageously close to the evaporation temperature, i.e. at +/−5° C. and, penetrates preferably, directly into the first intermediate steam generator 50. The liquid water is transformed into steam by the intermediate steam generator 50, which recovers the thermal energy coming from the dihydrogen produced by the electrolyser 1, at least through the first intermediate exchanger 6. According to the energy transmitted to the first intermediate generator 50, water emerges from it, and penetrates preferably directly through the fluid connection C into the electric steam generator 28.

The liquid water introduced through the connection A can be water from a water network or from recycled water coming from the separators of the system, or a mixture of the two.

According to the invention, the energy needing to be supplied by the electric steam generator 28 for the transformation of the liquid water into steam is reduced, thanks to the first thermal energy recovery module and advantageously, to the third thermal energy recovery module, in particular, to the condenser 23 of the heat pump.

Steam exits from the electric steam generator 28 through the fluid connection D and penetrates, preferably directly, into the first heat exchange module, preferably into the first heat exchanger 5a. The steam is heated in the first heat exchanger 5a by recovery of calories from the dihydrogen circulating in the first heat exchanger 5a. The overheated steam exits from the first heat exchanger 5a through the fluid connection F and penetrates, preferably directly, into the second heat exchanger 5b. The steam is heated again in the second heat exchanger 5b by recovery of calories from the dihydrogen circulating in the second heat exchanger 5b. The overheated steam exits from the second heat exchanger 5b through the fluid connection G and penetrates, preferably directly, into the electric heater 14, if needed. The electric heater 14 ensures the last temperature increase which is possibly necessary, such that the steam reaches a predefined target temperature to enter into the electrolyser 1. Steam exits from the electric heater 14 through the fluid connection H and penetrates, preferably directly, into the electrolyser 1.

In operation, according to the second embodiment illustrated in FIG. 2, the liquid water arrives in the first supply line 2 in steam, more specifically in the first portion through the fluid connection. The liquid water arrives through the fluid connection I and supplies the two branches of the first supply line 2.

The water circulating in the fluid connection I penetrates, preferably directly, into the fluid connection J and therefore into the reducer 40. The liquid water is depressed at the outlet of the reducer 40. The depressed water penetrates through the fluid connection J in the second intermediate steam generator 60. In the second intermediate steam generator 60, the depressed water is heated, thanks to the inlet of calories recovered on the first dihydrogen discharge line 4, and in particular, through the third intermediate exchanger 8, optionally the ninth intermediate exchanger 36, the eleventh intermediate exchanger 38, the twelfth intermediate exchanger 39. The overheated liquid water exits from the second intermediate steam generator 60 through the fluid connection K and penetrates, preferably directly, into the condenser 23. In the condenser 23, the depressed overheated liquid water is heated by the condenser 23 of the heat pump. The overheated liquid water emerges from the condenser 23 through the fluid connection L and penetrates, preferably directly, into the electric steam generator 28. If the electric steam generator 28 is in operation, as the overheated liquid water requires an additional heat inlet, the water emerges from the electric steam generator 28 through the fluid connection M and penetrates, preferably directly, into the compressor 41. The compressor 41 makes it possible to increase the pressure of the water circulating in the depressed section to 1 atmospheric pressure. The steam at atmospheric pressure exits from the compressor 41 through the fluid connection N and penetrates, preferably directly, into the 1st heat exchanger 5a of the first heat exchange module.

At the other branch, the water circulating in the fluid connection I penetrates, preferably directly, into the fluid connection O and penetrates, preferably directly, into the first intermediate steam generator 50. In the first intermediate steam generator 50, the water is heated at atmospheric pressure by the calories recovered on the first dihydrogen discharge line 3 and, in particular, by the first intermediate exchanger 6, and optionally by the eighth intermediate exchanger 35, the tenth intermediate exchanger 37, the fourth intermediate exchanger 9. The water is advantageously transformed into steam in the first intermediate steam generator 50 and emerges from it through the fluid connection P penetrating preferably directly into the fluid connection N.

The steam is heated in the first heat exchanger 5a by recovery of calories from the dihydrogen circulating in the first heat exchanger 5a. The overheated steam exits from the first heat exchanger 5a through the fluid connection F and penetrates, preferably directly, into the second heat exchanger 5b. The steam is heated again in the second heat exchanger 5b by recovery of calories from the dihydrogen circulating in the second heat exchanger 5b. The overheated steam exits from the second heat exchanger 5b through the fluid connection G and penetrates, preferably directly, into the electric heater 14, if needed. The electric heater 14 ensures the last increase in temperature possibly necessary, such that the steam reaches a predefined target temperature to enter into the electrolyser 1. The steam exits from the electric heater 14 through the fluid connection H and penetrates, preferably directly, into the electrolyser 1.

One or more pumps can be placed on the different fluid connections to move the liquid water and advantageously ensure a pressurising of the first supply line 2.

The electrolyser 1 is supplied with electric current according to a predefined voltage and intensity, making it possible to ensure electrolysis and therefore the production of dihydrogen and dioxygen.

The dihydrogen exits from the electrolyser 1 through the first discharge line, through the fluid connection 300 and penetrates, preferably directly, into the first heat exchange module, preferably the second heat exchanger 5b. The dihydrogen exits from the electrolyser in the bot gaseous state, it is necessary to lower its temperature to use it and/or store it. The calories from the dihydrogen are therefore recovered by the first supply line, and more specifically, the steam circulating there. In the second heat exchanger 5b, the dihydrogen has its temperature lowered by transfer of calories in favour of the steam circulating in the second heat exchanger 5b. The cooled dihydrogen exits from the second heat exchanger 5b through the fluid connection 301 and penetrates, preferably directly, into the first heat exchanger 5a. In the first heat exchanger 5a, the dihydrogen again has its temperature lowered by transfer of calories in favour of the steam circulating in the first heat exchanger 5a. The cooled dihydrogen exits from the first heat exchanger Sa through the fluid connection 302 and penetrates, preferably directly, into the first intermediate exchanger 6. By passing into the first intermediate exchanger 6, the dihydrogen is cooled, as it transfers calories to the intermediate fluid circulating in the first intermediate fluid circuit.

According to the first embodiment illustrated in FIG. 1, the dihydrogen exits from the first intermediate exchanger 6 through the fluid connection 303 and penetrates, preferably directly, into the second intermediate exchanger 7. In this second intermediate exchanger 7, the dihydrogen is cooled, as it transfer calories to the intermediate fluid circulating in the intermediate fluid circuit 32. The dihydrogen exits from the second intermediate exchanger 7 through the fluid connection 304 and penetrates, preferably directly, into the first air cooler 16. The dihydrogen exits from the first air cooler 16 through the fluid connection 305 and penetrates, preferably directly, into the liquid/gas separator 17 ensuring the condensation of the dihydrogen. The dihydrogen exits from the liquid/gas separator 17 through the fluid connection 306 and undergoes, if needed, another compression in view of another condensation. In this case, the dihydrogen exits from the liquid/gas separator 17 through the fluid connection 306 and penetrates, preferably directly, into the compressor 18, hence it exits through the fluid connection 307 and penetrates, preferably directly, into the fifth intermediate exchanger 12. By passing into the fifth intermediate exchanger 12, the dihydrogen is cooled, as it transfers calories to the intermediate fluid circulating in the intermediate fluid circuit 32. The dihydrogen exits from the fifth intermediate exchanger 12 through the fluid connection 308 and penetrates, preferably directly, into the second air cooler 19 ensuring the cooling of the dihydrogen. The dihydrogen exits from the air cooler 19 through the fluid connection 309 and penetrates, preferably directly, into the liquid/gas separator 20 ensuring the condensation of the dihydrogen. The condensed dihydrogen exits from the liquid/gas separator 20 through the fluid connection 310 and undergoes, if needed, another compression in view of another condensation. In this case, the dihydrogen exits from the liquid/gas separator 20 through the fluid connection 310 and penetrates, preferably directly, into the compressor 30, hence it exits through the fluid connection 311 and penetrates, preferably directly, into the sixth intermediate exchanger 15. By passing into the sixth intermediate exchanger 15, the dihydrogen is cooled, as it transfers calories to the intermediate fluid circulating in the intermediate fluid circuit 32. The dihydrogen exits from the sixth intermediate exchanger 15 through the fluid connection 312 and penetrates, preferably directly, into the second air cooler 31 ensuring the cooling of the dihydrogen. The dihydrogen exits from the air cooler 31 through the fluid connection 313 and penetrates, preferably directly, into the liquid/gas separator 34 ensuring the condensation of the dihydrogen. The condensed dihydrogen exits from the liquid/gas separator 34 through the fluid connection 314 and can be used or stored. The condensed liquid water recovered from the liquid/gas separator 17, 20, 34 can be recycled in the first steam supply line 2 by fluid connection with the water recycling line 21.

According to the second embodiment illustrated in FIG. 2, the dihydrogen exits from the first intermediate exchanger 6 through the fluid connection 315 and penetrates, preferably directly, into the third intermediate exchanger 316. The dihydrogen exits from the third intermediate exchanger 316 and penetrates, preferably directly, into the second intermediate exchanger 7. The dihydrogen exits from the second intermediate exchanger 7 through the fluid connection 304 and penetrates, preferably directly, into the air cooler 16. The dihydrogen exits from the first air cooler 16 through the fluid connection 305 and penetrates, preferably directly, into the liquid/gas separator 17 ensuring the condensation of the dihydrogen. The dihydrogen exits from the liquid/gas separator 17 through the fluid connection 306 and undergoes, if needed, another compression in view of another condensation. In this case, the dihydrogen exits from the liquid/gas separator 17 through the fluid connection 306 and penetrates, preferably directly, into the compressor 18, hence it exits through the fluid connection 317 and penetrates, preferably directly, into the eighth intermediate exchanger 35. The dihydrogen exits from the eighth intermediate exchanger through the fluid connection 318 and penetrates, preferably directly, into the ninth intermediate exchanger 36. The dihydrogen exits from the ninth intermediate exchanger 36 through the fluid connection 319 and penetrates, preferably directly, into the fifth intermediate exchanger 12. By passing into the fifth intermediate exchanger 12, the dihydrogen is cooled, as it transfers calories to the intermediate fluid circulating in the intermediate fluid circuit 32. The dihydrogen exits from the fifth intermediate exchanger 12 through the fluid connection 308 and penetrates, preferably directly, into the second air cooler 19 ensuring the cooling of the dihydrogen. The dihydrogen exits from the air cooler 19 through the fluid connection 309 and penetrates, preferably directly, into the liquid/gas separator 20 ensuring the condensation of the dihydrogen. The condensed dihydrogen exits from the liquid/gas separator 20 through the fluid connection 310 and undergoes, if needed, another compression in view of another condensation. In this case, the dihydrogen exits from the liquid/gas separator 20 through the fluid connection 310 and penetrates, preferably directly, into the compressor 30, hence it exits through the fluid connection 320. By passing into the fifth intermediate exchanger 12, the dihydrogen is cooled, as it transfers calories to the intermediate fluid circulating in the intermediate fluid circuit 32. The dihydrogen exits from the fifth intermediate exchanger 12 through the fluid connection 308 and penetrates, preferably directly, into the second air cooler 19 ensuring the cooling of the dihydrogen. The dihydrogen exits from the air cooler 19 through the fluid connection 309 and penetrates, preferably directly, into the liquid/gas separator 20 ensuring the condensation of the dihydrogen. The condensed dihydrogen exits from the liquid/gas separator 20 through the fluid connection 310 and undergoes, if needed, another compression in view of another condensation. In this case, the dihydrogen exits from the liquid/gas separator 20 through the fluid connection 310 and penetrates, preferably directly, into the compressor 30, hence it exits through the fluid connection 320. The dihydrogen penetrates, preferably directly, into the tenth intermediate exchanger 37. The dihydrogen exits from the tenth intermediate exchanger 37 through the fluid connection 321 and penetrates, preferably directly, into the eleventh intermediate exchanger 38. The dihydrogen exits from the eleventh intermediate exchanger 38 through the fluid connection 322 and penetrates, preferably directly, into the sixth intermediate exchanger 15. The dihydrogen exits from the sixth intermediate exchanger through the fluid connection 312 and penetrates, preferably directly, into the second air cooler 31 ensuring the cooling of the dihydrogen. The dihydrogen exits from the air cooler 31 through the fluid connection 313 and penetrates, preferably directly, into the liquid/gas separator 34 ensuring the condensation of the dihydrogen. The condensed dihydrogen exits from the liquid/gas separator 34 through the fluid connection 314 and can be used or stored.

The dioxygen produced by the electrolyser exits through the second discharge line 3, through the fluid connection 100 and penetrates, preferably directly, into the second heat exchange module, preferably the second heat exchanger 11b. The dioxygen exits from the electrolyser in the hot gaseous state, it is necessary to lower its temperature for discharge into the air. The calories from the dioxygen are therefore advantageously recovered by the second supply line 10 and, more specifically, the air circulating there. In the second heat exchanger 11b, the dioxygen has its temperature lowered by transfer of calories in favour of the air circulating in the second heat exchanger 11b. The cooled dioxygen exits from the second heat exchanger 11b through the fluid connection 101 and penetrates, preferably directly, into the first heat exchanger 11a. In the first heat exchanger 11a, the dioxygen again has its temperature lowered by transfer of calories in favour of the air circulating in the first heat exchanger 11a. The cooled dioxygen exits from the first heat exchanger 11a through the fluid connection 102 and advantageously, penetrates, preferably directly, into the fourth intermediate exchanger 9 of the recovery module. By passing into the fourth intermediate exchanger 9, the dioxygen again has its temperature lowered by transfer of calories in favour of the liquid water circulating in the intermediate exchanger 9.

According to a first embodiment illustrated in FIG. 1, the air exits from the intermediate exchanger 9 through the fluid connection 103 and penetrates, preferably directly, into a seventh intermediate exchanger 29. In the seventh intermediate exchanger 29, the dihydrogen is cooled, as it transfers calories to the intermediate fluid circulating in the intermediate fluid circuit 32. The dihydrogen exits from the seventh intermediate exchanger 29 through the fluid connection 104 and is discharged into the air.

According to a second embodiment illustrated in FIG. 2, the air exits from the fourth intermediate exchanger 9 through the fluid connection 105 and penetrates, preferably directly, into the twelfth intermediate exchanger 39. The air exits from the second intermediate exchanger 39 through the fluid connection 106 and penetrates, preferably directly, into the seventh intermediate exchanger 29. The dihydrogen exits from the seventh intermediate exchanger 29 through the fluid connection 104 and is discharged into the air.

According to an option, air is supplied to the electrolyser 1. The air arrives through the second supply line 10. Advantageously, the air passes through the second heat exchanger replacing the air cooler 16 and recovers calories from the dihydrogen circulating in the heat exchanger. This first heat exchange ensures a first heating of the air. The air exits from the heat exchanger through the fluid connection 110 and penetrates, preferably directly, into the compressor 30. According to the option illustrated, the air is compressed by the compressor 30 and its temperature increases. The air penetrates into the compressor 30 through the fluid connection 110. The air exits from the compressor 30 through the fluid connection 111 and penetrates, preferably directly, into the second heat exchange module, preferably into the first heat exchanger 11a. The air is heated in the first heat exchanger 11a by recovery of calories from the dioxygen circulating in the first heat exchanger 11a. The overheated air exits from the first heat exchanger 11a through the fluid connection 112 and penetrates, preferably directly, into the second heat exchanger 11b. The air is heated again in the second heat exchanger 11b by recovery of calories from the dioxygen circulating in the second heat exchanger 11b. The overheated air exits from the second heat exchanger 11b through the fluid connection 113 and penetrates, preferably directly, into the electric heater 13, if needed. The electric heater 13 ensures the last increase of temperature possibly necessary such that the air reaches a predefined target temperature to enter into the electrolyser 1. The air exits from the electric heater 13 through the fluid connection 114 and penetrates, preferably directly, into the electrolyser 1.

LIST OF REFERENCES

1. Electrolyser
2. Steam supply line
3. Dioxygen discharge line
4. Dihydrogen discharge line
5a. First heat exchanger of the first heat exchange module
5b. Second heat exchanger of the first heat exchange module
6. First intermediate exchanger
7. Second intermediate exchanger
8. Third intermediate exchanger
9. Fourth intermediate exchanger
10. Air supply line
11a. First heat exchanger of the second heat exchange module
11b. Second heat exchanger of the second heat exchange module 12. Fifth intermediate exchanger
13. Electric heater
14. Electric heater
15. Sixth intermediate exchanger
16. Air cooler
17. Liquid/gas separator
18. Compressor
19. Air cooler
20. Liquid/gas separator
21. Water recycling line
22. Compressor
23. Condenser
24. Reducer
25. Evaporator
26. Compressor
27. Fluid circuit
28. Electric steam generator
29. Seventh heat exchanger
30. Compressor
31. Air cooler
32. Third intermediate fluid circuit
33. Pump
34. Separator
35. Eighth intermediate exchanger
36. Ninth intermediate exchanger
37. Tenth intermediate exchanger
38. Eleventh intermediate exchanger
39. Twelfth intermediate exchanger
40. Reducer
41. Compressor
50. First low pressure steam generator
60. Second low pressure steam generator
A. Fluid connection entering into the condenser 23
B. Fluid connection between the condenser 23 and the first intermediate generator 50
C. Fluid connection between the first intermediate generator 50 and the electric steam generator 28
D. Fluid connection between the electric steam generator 28 and the first heat exchanger 5a
E. Fluid connection between the first heat exchanger 5a and the fluid connection D
F. Fluid connection between the first heat exchanger 5a and the second heat exchanger 5b
G. Fluid connection between the second heat exchanger 5b and the heater 14
H. Fluid connection between the heater 14 and the electrolyser 1
I. Fluid connection entering into the steam supply line 2
J. Fluid connection between the fluid connection I and the second intermediate generator 60 preferably comprising the reducer 40
K. Fluid connection between the second intermediate generator 60 and the condenser 23
L. Fluid connection between the condenser 23 and the electric generator 28
M. Fluid connection between the electric generator 28 and the compressor 41
N. Fluid connection between the compressor 41 and the first exchanger 5a of the first heat exchanger module 5
O. Fluid connection between the fluid connection I and the first intermediate generator 50
P. Fluid connection between the first intermediate generator 50 and the fluid connection N
100. Fluid connection between the electrolyser 1 and the second heat exchanger 11b
101. Fluid connection between the second heat exchanger 11b and the first heat exchanger 11a
102. Fluid connection between the first heat exchanger 11a and the intermediate exchanger 9
103. Fluid connection between the intermediate exchanger 9 and the intermediate exchanger 29
104. Outlet fluid connection of the heat exchanger 29
105. Fluid connection between the intermediate exchanger 9 and the intermediate exchanger 39
106. Fluid connection between the intermediate exchanger 29 and the intermediate exchanger 39
110. Inlet fluid connection in the compressor 30
111. Fluid connection between the compressor 30 and the first heat exchanger 11a
112. Fluid connection between the first heat exchanger 11a and the second heat exchanger 11b
113. Fluid connection between the second heat exchanger 11b and the heater 13
114. Fluid connection between the heater 13 and the electrolyser 1
200. Fluid connection between the compressor 26 and the condenser 23
201. Fluid connection between the condenser 23 and the reducer 24
202. Fluid connection between the reducer 24 and the evaporator 25
203. Fluid connection between the evaporator 25 and the compressor 26
300. Fluid connection between the electrolyser 1 and the second heat exchanger 5b
301. Fluid connection between the second heat exchanger 5b and the first heat exchanger 5a
302. Fluid connection between the first heat exchanger 5a and the first intermediate exchanger 6
303. Fluid connection between the first intermediate exchanger 6 and the second intermediate heat exchanger 7
304. Fluid connection between the second intermediate heat exchanger 7 and the air cooler 16
305. Fluid connection between the air cooler 16 and the liquid/gas separator 17
306. Fluid connection between the liquid/gas separator 17 and the compressor 18
307. Fluid connection between the compressor 18 and the fifth intermediate exchanger 12
308. Fluid connection between the fifth intermediate exchanger 12 and the air cooler 19
309. Fluid connection between the air cooler 19 and the liquid/gas separator 20
310. Fluid connection between the liquid/gas separator 20 and the compressor 22
311. Fluid connection between the compressor 22 and the sixth intermediate exchanger
312. Fluid connection between the sixth intermediate exchanger 15 and the air cooler 31
313. Fluid connection between the air cooler 31 and the liquid/gas separator 34
314. Outlet fluid connection of the dihydrogen of the liquid/gas separator 34
315. Fluid connection between the first intermediate exchanger 6 and the third intermediate exchanger 8
316. Fluid connection between the third intermediate heat exchanger 8 and the second intermediate heat exchanger 7
317. Fluid connection between the compressor 18 and the eighth intermediate exchanger 35
318. Fluid connection between the eighth intermediate exchanger 35 and the ninth intermediate exchanger 36

319. Fluid connection between the ninth intermediate exchanger 36 and the fifth intermediate exchanger 12
320. Fluid connection between the compressor 22 and the tenth intermediate exchanger 37
321. Fluid connection between the tenth intermediate exchanger 37 and the eleventh intermediate exchanger 38
322. Fluid connection between the eleventh intermediate exchanger 38 and the sixth intermediate exchanger 15
400. Fluid connection between the outlet of the second intermediate exchanger 7 and the evaporator 25
401. Fluid connection between the evaporator 25 and the inlet of the second intermediate exchanger 7
402. Fluid connection between the outlet of the fifth intermediate exchanger 12 and the evaporator 25
403. Fluid connection between the evaporator 25 and the inlet of the fifth intermediate exchanger 12
404. Fluid connection between the outlet of the sixth intermediate exchanger 15 and the evaporator 25
405. Fluid connection between the evaporator 25 and the inlet of the sixth intermediate exchanger 15
406. Fluid connection between the outlet of the seventh intermediate exchanger 29 and the evaporator 25
407. Fluid connection between the evaporator 25 and the inlet of the seventh intermediate exchanger 29
410. Main branch from the evaporator 25 to the intermediate exchanger
411. Main branch from the intermediate exchanger to the evaporator 25
500. Fluid connection between the outlet of the first intermediate exchanger 6 and the first intermediate generator 50
501. Fluid connection between the first intermediate generator 50 and the inlet of the first intermediate exchanger 6
502. Fluid connection between the outlet of the fourth intermediate exchanger 9 and the first intermediate generator 50
503. Fluid connection between the first intermediate generator 50 and the inlet of the fourth intermediate exchanger 9
504. Fluid connection between the outlet of the eighth intermediate exchanger 35 and the first intermediate generator 50
505. Fluid connection between the first intermediate generator 50 and the inlet of the eighth intermediate exchanger 35
506. Fluid connection between the outlet of the tenth intermediate exchanger 37 and the first intermediate generator 50
507. Fluid connection between the first intermediate generator 50 and the inlet of the tenth intermediate exchanger 37
510. Main branch from the first intermediate generator 50 to the intermediate exchanger
511. Main branch from the intermediate exchanger to the first intermediate generator 50
600. Fluid connection between the outlet of the third intermediate exchanger 8 and the second intermediate generator 60
601. Fluid connection between the second intermediate generator 60 and the inlet of the third intermediate exchanger 8
602. Fluid connection between the outlet of the twelfth intermediate exchanger 39 and the second intermediate generator 60
603. Fluid connection between the second intermediate generator 60 and the inlet of the twelfth intermediate exchanger 39
604. Fluid connection between the outlet of the ninth intermediate exchanger 36 and the second intermediate generator 60
605. Fluid connection between the second intermediate generator 60 and the inlet of the ninth intermediate exchanger 36
606. Fluid connection between the outlet of the eleventh intermediate exchanger 38 and the second intermediate generator 60
607. Fluid connection between the second intermediate generator 60 and the inlet of the eleventh intermediate exchanger 38
610. Main branch from the second intermediate generator 60 to the intermediate exchanger
611. Main branch from the intermediate exchanger to the second intermediate generator 60

The invention claimed is:
1. A system, comprising:
a high temperature electrolyser,
a first supply line of the electrolyser configured to supply the electrolyser with steam,
a first discharge line of the electrolyser configured to discharge dihydrogen from the electrolyser,
a second discharge line of the electrolyser configured to discharge dioxygen from the electrolyser,
a first heat exchange module configured to ensure a heat exchange between the first supply line and the first discharge line,
a first module configured to recover thermal energy from the dihydrogen at an outlet of the first heat exchange module to be supplied to the first supply line, the first module comprising:
a first intermediate exchanger arranged on the first discharge line downstream from the first heat exchange module and configured to transfer the thermal energy from the dihydrogen to a first intermediate fluid,
a first intermediate steam generator arranged on the first supply line configured to transfer the thermal energy from the first intermediate fluid output from the first intermediate exchanger to liquid water, and
a first intermediate fluid circuit configured to receive the first intermediate fluid and ensure a fluid connection between the first intermediate exchanger and the first intermediate steam generator,
a third module for recovering the thermal energy from the dihydrogen at the outlet of the first heat exchange module to be supplied to the first supply line, the third module comprising a heat pump and an intermediate circuit, the intermediate circuit comprising:
a second intermediate exchanger arranged on the first discharge line downstream from the first heat exchange module and configured to transfer the thermal energy from the dihydrogen to a second intermediate fluid, and
a third intermediate fluid circuit configured to receive the second intermediate fluid and ensure a fluid connection between the second intermediate exchanger and an evaporator of the heat pump, the heat pump comprising:
a fluid circuit configured to receive a heat-transfer fluid, the evaporator arranged on the third intermediate fluid circuit and configured to transfer the thermal energy from the second intermediate fluid to the heat-transfer fluid, a compressor configured to compress the heat-transfer fluid, a condenser arranged on the first supply line upstream from the first heat exchange module and configured to transfer the thermal energy from the heat-transfer fluid to the liquid water, and a reducer configured to reduce the heat-transfer fluid, the fluid circuit being configured to fluidically connect the evaporator to the compressor, the compressor to the condenser, the condenser to the reducer and the reducer to the evaporator, and a fifth intermediate exchanger arranged on the first discharge line downstream from the second intermediate exchanger and in parallel with the second intermediate exchanger on the third intermediate fluid circuit and configured to transfer the thermal energy from the dihydrogen to the second intermediate fluid, wherein the third intermediate circuit is configured to receive the second intermediate fluid from the fifth intermediate exchanger and ensure a fluid connection between the fifth intermediate exchanger and the evaporator of the heat pump.

2. The system according to claim 1, further comprising a sixth intermediate exchanger arranged on the first discharge line downstream from the fifth intermediate exchanger and in parallel with the second intermediate exchanger and with the fifth intermediate exchanger on the third intermediate fluid circuit and configured to transfer the thermal energy from the dihydrogen to the second intermediate fluid.

3. The system according to claim 1, further comprising an electric steam generator arranged on the first supply line upstream from the first heat exchange module.

4. The system according to claim 3, wherein the electric steam generator is arranged downstream from the first intermediate steam generator.

5. The system according to claim 1, further comprising a second recovery module configured to recover the thermal energy from the dihydrogen at the outlet of the first heat exchange module to be supplied to the first supply line, the second recovery module comprising:

a third intermediate exchanger arranged on the first discharge line downstream from the first heat exchange module and configured to transfer the thermal energy from the dihydrogen to a third intermediate fluid, a second reducer and a second compressor arranged upstream from the first heat exchange module on the first supply line and defining together a depressed section of the first supply line, a second intermediate steam generator arranged on the depressed section of the first supply line and configured to transfer the thermal energy from the third intermediate fluid to the liquid water, and a second intermediate fluid circuit configured to receive the third intermediate fluid and ensure a fluid connection between the third intermediate exchanger and the second steam generator.

6. The system according to claim 5, wherein an electric steam generator is arranged on the depressed section downstream from the second steam generator.

7. The system according to claim 5, wherein the first supply line comprises a main branch on which the first intermediate steam generator is arranged, and a depressed branch comprising the depressed section, wherein the main branch and the depressed branch being are arranged in parallel.

8. The system according to claim 1, further comprising a second supply line of the electrolyser configured to supply the electrolyser with air.

9. The system according to claim 8, further comprising a second heat exchange module configured to ensure a heat exchange between the second supply line and the second discharge line.

10. The system according to claim 1, further comprising a fourth intermediate exchanger arranged on the second discharge line and in parallel with the first intermediate exchanger on the first intermediate fluid circuit.

11. The system according to claim 10, further comprising a seventh intermediate exchanger arranged on the second discharge line downstream from the fourth intermediate exchanger and in parallel with the second intermediate exchanger on the third intermediate fluid circuit, and configured to transfer the thermal energy from the dioxygen to the third intermediate fluid.

* * * * *